(12) United States Patent
Larsson et al.

(10) Patent No.: US 11,212,707 B2
(45) Date of Patent: Dec. 28, 2021

(54) ALLOCATION OF RESOURCES TO A WIRELESS DEVICE

(71) Applicant: Telefonaktiebolaget LM Ericsson (publ), Stockholm (SE)

(72) Inventors: Daniel Larsson, Lund (SE); Niklas Andgart, Södra Sandby (SE); Laetitia Falconetti, Järfälla (SE); Jingya Li, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 7 days.

(21) Appl. No.: 16/300,676

(22) PCT Filed: May 11, 2017

(86) PCT No.: PCT/EP2017/061397
§ 371 (c)(1),
(2) Date: Nov. 12, 2018

(87) PCT Pub. No.: WO2017/194707
PCT Pub. Date: Nov. 16, 2017

(65) Prior Publication Data
US 2019/0281499 A1   Sep. 12, 2019

Related U.S. Application Data

(60) Provisional application No. 62/335,941, filed on May 13, 2016.

(51) Int. Cl.
*H04W 72/14* (2009.01)
*H04W 72/12* (2009.01)
(Continued)

(52) U.S. Cl.
CPC ......... *H04W 28/16* (2013.01); *H04W 72/042* (2013.01); *H04W 72/1289* (2013.01); *H04W 72/0446* (2013.01); *H04W 72/14* (2013.01)

(58) Field of Classification Search
CPC ............. H04W 28/16; H04W 72/1289; H04W 72/042; H04W 72/0446; H04W 72/14;
(Continued)

(56) References Cited

U.S. PATENT DOCUMENTS

2010/0290418 A1   11/2010   Nishio et al.
2013/0155872 A1   6/2013   Subramanian et al.
(Continued)

FOREIGN PATENT DOCUMENTS

JP   2014533473 A   12/2014
WO   2009087742 A1   7/2009
(Continued)

OTHER PUBLICATIONS

Definition of "via" from Oxford Languages (Year: 2021).*
(Continued)

*Primary Examiner* — Moo Jeong
(74) *Attorney, Agent, or Firm* — Coats & Bennett, PLLC

(57) ABSTRACT

There is provided mechanisms for allocating resources to a wireless device. A method is performed by a network node. The method comprises transmitting a control message in a search space to the wireless device, the search space comprising at least two groups of Control Channel Elements (CCEs), wherein one of the groups of CCEs comprises the control message. The method comprises transmitting information to the wireless device indicating at least one of the groups of CCEs comprising resources for the wireless device.

27 Claims, 8 Drawing Sheets

| CCE group 1 | CCE group 2 | CCE group 3 | | CCE group 4 |
|---|---|---|---|---|
| UL fast DCI of UE2 | UL fast DCI of UE3 | DL fast DCI of UE1 | Used for UE1 sPDSCH | Resources used for sPDSCH of UE1 |

(51) Int. Cl.
*H04W 72/04* (2009.01)
*H04W 28/16* (2009.01)
*H04L 5/00* (2006.01)

(58) Field of Classification Search
CPC ... H04W 72/044; H04L 5/0053; H04L 5/0044
See application file for complete search history.

(56) References Cited

U.S. PATENT DOCUMENTS

| | | | |
|---|---|---|---|
| 2014/0071911 A1 | 3/2014 | Horiuchi et al. | |
| 2014/0071934 A1* | 3/2014 | Frenne | H04L 5/0053 370/330 |
| 2017/0280429 A1* | 9/2017 | Shen | H04W 72/0446 |

FOREIGN PATENT DOCUMENTS

| | | |
|---|---|---|
| WO | 2010151187 A1 | 12/2010 |
| WO | 2011099607 A1 | 8/2011 |
| WO | 2013071482 A1 | 5/2013 |
| WO | 2015082096 A1 | 6/2015 |
| WO | 2016064049 A1 | 4/2016 |
| WO | 2017194705 A1 | 11/2017 |
| WO | 2017194706 A1 | 11/2017 |

OTHER PUBLICATIONS

Definition of "by means of" from Oxford Languages (Year: 2021).*
Ericsson, "Downlink Control Signaling Design for Short TTI", 3GPP TSG RAN WG1 Meeting #84bis, Busan, KR, Apr. 11, 2016, pp. 1-4, R1-163322, 3GPP.
3rd Generation Partnership Project, "LTE; Evolved Universal Terrestrial Radio Access (E-UTRA) Physical layer procedures", Technical Specification, (3GPP TS 36.213 version 13.1.1 Release 13), ETSI TS 136 213 V13.1.1, May 1, 2016, pp. 1-363, ETSI.
3rd Generation Partnership Project, "3rd Generation Partnership Project; Technical Specification Group Radio Access Network; Study on New Radio Access Technology Physical Layer Aspects (Release 14)", Technical Report, 3GPP TR 38.802 V14.0.0, Mar. 1, 2017, pp. 1-143, 3GPP.

* cited by examiner

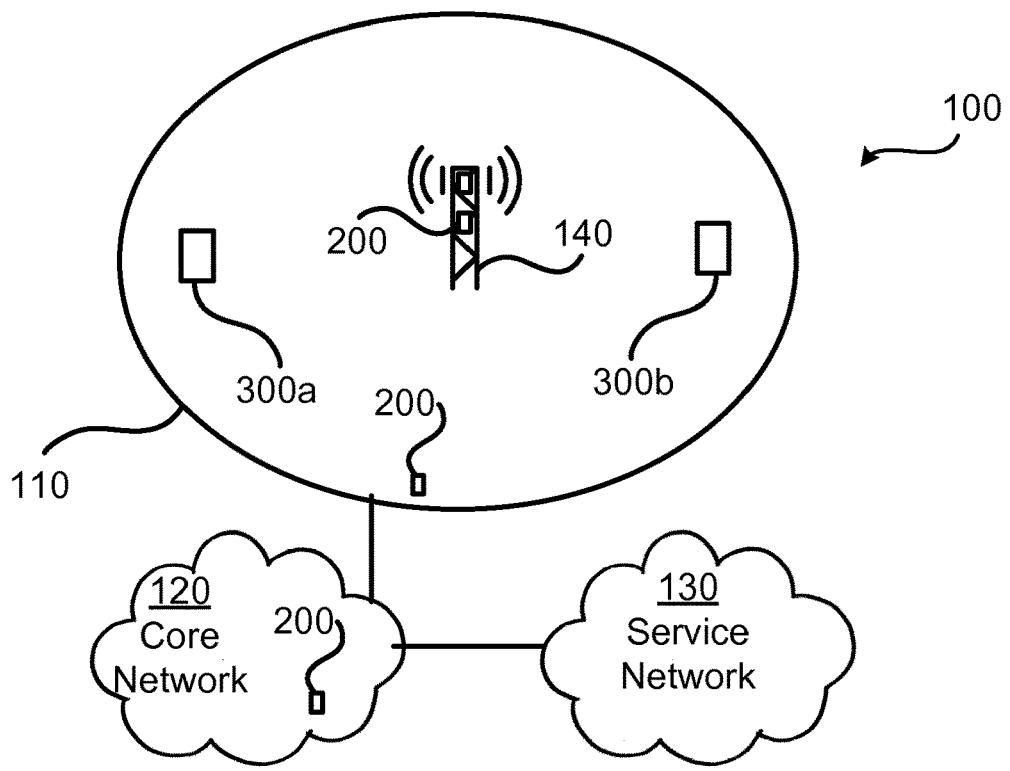
Fig. 1
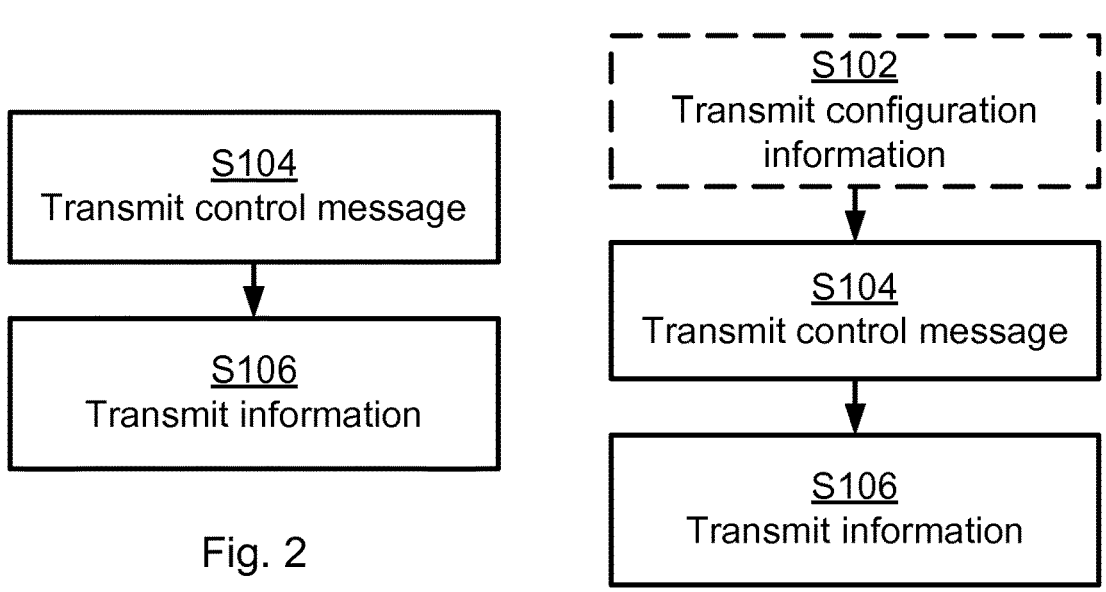
Fig. 2
Fig. 3

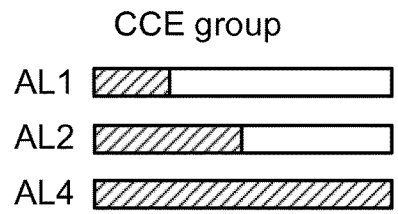
Fig. 6
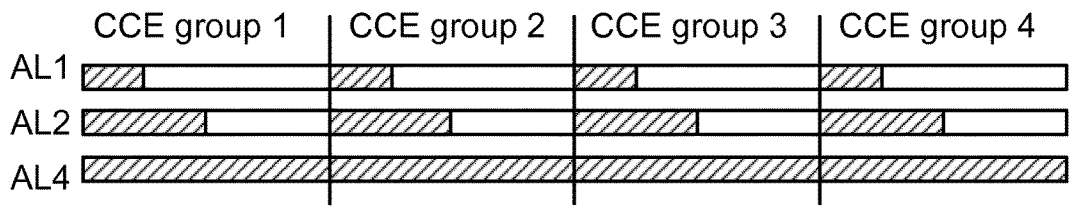
Fig. 7
| CCE group 1 | CCE group 2 | CCE group 3 | | CCE group 4 |
|---|---|---|---|---|
| Resources used for sPDSCH of UE1 | Resources used for sPDSCH of UE1 | DL fast DCI of UE1 | Used for UE1 sPDSCH | Resources used for sPDSCH of UE1 |
Fig. 8
| CCE group 1 | CCE group 2 | CCE group 3 | | CCE group 4 |
|---|---|---|---|---|
| UL fast DCI of UE2 | UL fast DCI of UE3 | DL fast DCI of UE1 | Used for UE1 sPDSCH | Resources used for sPDSCH of UE1 |
Fig. 10
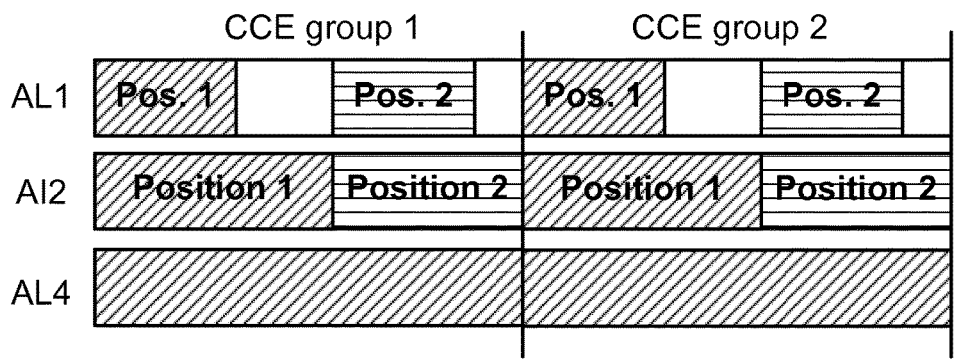
Fig. 11

ALLOCATION OF RESOURCES TO A WIRELESS DEVICE

TECHNICAL FIELD

Embodiments presented herein relate to a method, a network node, a, computer program, and a computer program product for allocating resources to a wireless device. Embodiments presented herein further relate to a method, a wireless device, a computer program, and a computer program product for receiving allocation of resources from a network node.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is packet data latency. Latency measurements can be performed in all stages of the communications network, for example when verifying a new software release or system component, and/or when deploying the communications network and when the communications network is in commercial operation.

Shorter latency than previous generations of 3GPP radio access technologies was one performance metric that guided the design of Long Term Evolution (LTE). LTE is also now recognized by the end-users to be a system that provides faster access to internet and lower packet latencies than previous generations of mobile radio technologies.

Packet latency is also a parameter that indirectly influences the throughput of the communications network. Traffic using the Hypertext Transfer Protocol (HTTP) and/or the Transmission Control Protocol (TCP) is currently one of the dominating application and transport layer protocol suite used on the Internet. The typical size of HTTP based transactions over the Internet is in the range of a few 10's of Kilo byte up to 1 Mega byte. In this size range, the TCP slow start period is a significant part of the total transport period of the packet stream. During TCP slow start the performance is packet latency limited. Hence, improved packet latency can potentially improve the average throughput, at least for this type of TCP based data transactions.

Radio resource efficiency could also be positively impacted by packet latency reductions. Lower packet data latency could increase the number of transmissions possible within a certain delay bound; hence higher Block Error Rate (BLER) targets could be used for the data transmissions freeing up radio resources potentially improving the capacity of the system.

The existing physical layer downlink control channels, Physical Downlink Control Channel (PDCCH) and enhanced PDCCH (ePDCCH), are used to carry Downlink Control Information (DCI) such as scheduling decisions for uplink (UL; from device to network) and downlink (DL; from network to device) and power control commands. Both PDCCH and ePDCCH are according to present communications networks transmitted once per 1 ms subframe.

3GPP TS 36.213 v13.1.1 lists examples of different (DCI) formats for uplink (UL) and downlink (DL) resource assignments. UL scheduling grants use either DCI format 0 or DCI format 4. The latter was added in the 3rd Generation Partnership Project (3GPP) Release 10 (Rel-10) for supporting uplink spatial multiplexing The existing way of operation, e.g. frame structure and control signalling, are designed for data allocations in subframes of a fixed length of 1 ms, which may vary only in allocated bandwidth. Specifically, the current DCIs define resource allocations within the entire subframe, and are only transmitted once per subframe. The existing way of operation does not indicate how scheduling of UL and DL data can be performed in short subframes, i.e., subframes shorter than 1 ms.

Hence, there is a need for efficient communications using short subframes.

SUMMARY

An object of embodiments herein is to provide mechanisms for communications using short subframes.

According to a first aspect there is presented a method for allocating resources to a wireless device. The method is performed by a network node. The method comprises transmitting a control message in a search space to the wireless device, the search space comprising at least two groups of Control Channel Elements (CCEs), wherein one of the groups of CCEs comprises the control message. The method comprises transmitting information to the wireless device indicating at least one of the groups of CCEs comprising resources for the wireless device.

According to a second aspect there is presented a network node for allocating resources to a wireless device. The network node comprises processing circuitry. The processing circuitry is configured to cause the network node to transmit a control message in a search space to the wireless device, the search space comprising at least two groups of CCEs, wherein one of the groups of CCEs comprises the control message. The processing circuitry is configured to cause the network node to transmit information to the wireless device indicating at least one of the groups of CCEs comprising resources for the wireless device.

According to a third aspect there is presented a network node for allocating resources to a wireless device. The network node comprises processing circuitry and a computer program product. The computer program product stores instructions that, when executed by the processing circuitry, causes the network node to perform steps, or operations. The steps, or operations, cause the network node to transmit a control message in a search space to the wireless device, the search space comprising at least two groups of CCEs, wherein one of the groups of CCEs comprises the control message. The steps, or operations, cause the network node to transmit information to the wireless device indicating at least one of the groups of CCEs comprising resources for the wireless device.

According to a fourth aspect there is presented a network node for allocating resources to a wireless device. The network node comprises a transmit module configured to transmit a control message in a search space to the wireless device, the search space comprising at least two groups of CCEs, wherein one of the groups of CCEs comprises the control message. The network node comprises a transmit module configured to transmit information to the wireless device indicating at least one of the groups of CCEs comprising resources for the wireless device.

According to a fifth aspect there is presented a computer program for allocating resources to a wireless device, the computer program comprising computer program code which, when run on processing circuitry of a network node, causes the network node to perform a method according to the first aspect.

According to a sixth aspect there is presented a method for receiving allocation of resources from a network node. The method is performed by a wireless device. The method comprises receiving a control message in a search space from the network node, the search space comprising at least two groups of CCEs wherein one of the groups of CCEs comprises the control message. The method comprises receiving information from the network node indicating at least one of the groups of CCEs comprising resources for the wireless device.

According to a seventh aspect there is presented a wireless device for receiving allocation of resources from a network node. The wireless device comprises processing circuitry. The processing circuitry is configured to cause the wireless device to receive a control message in a search space from the network node, the search space comprising at least two groups of CCEs wherein one of the groups of CCEs comprises the control message. The processing circuitry is configured to cause the wireless device to receive information from the network node indicating at least one of the groups of CCEs comprising resources for the wireless device.

According to an eighth aspect there is presented a wireless device for receiving allocation of resources from a network node. The wireless device comprises processing circuitry and a computer program product. The computer program product stores instructions that, when executed by the processing circuitry, causes the wireless device to perform steps, or operations. The steps, or operations, cause the wireless device to receive a control message in a search space from the network node, the search space comprising at least two groups of CCEs wherein one of the groups of CCEs comprises the control message. The steps, or operations, cause the wireless device to receive information from the network node indicating at least one of the groups of CCEs comprising resources for the wireless device.

According to a ninth aspect there is presented a wireless device for receiving allocation of resources from a network node. The wireless device comprises a receive module configured to receive a control message in a search space from the network node, the search space comprising at least two groups of CCEs wherein one of the groups of CCEs comprises the control message. The wireless device comprises a receive module configured to receive information from the network node indicating at least one of the groups of CCEs comprising resources for the wireless device.

According to a tenth aspect there is presented a computer program for receiving allocation of resources from a network node, the computer program comprising computer program code which, when run on processing circuitry of a wireless device, causes the wireless device to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium can be a non-transitory computer readable storage medium.

Advantageously these methods, these network nodes, these wireless devices, and these computer programs provides efficient communications using short subframes.

Advantageously these methods, these network nodes, these wireless devices, and these computer programs allow unused resources (e.g., on short PDCCH) to be utilized (e.g., used for short PDSCH), in some embodiments without the wireless device having to share the same search space with another wireless device.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 1 is a schematic diagram illustrating a communication network according to embodiments;

FIGS. 2, 3, 4, and 5 are flowcharts of methods according to embodiments;

FIGS. 6-16 schematically illustrate search spaces in short TTIs according to embodiments;

DETAILED DESCRIPTION

Figure 4:
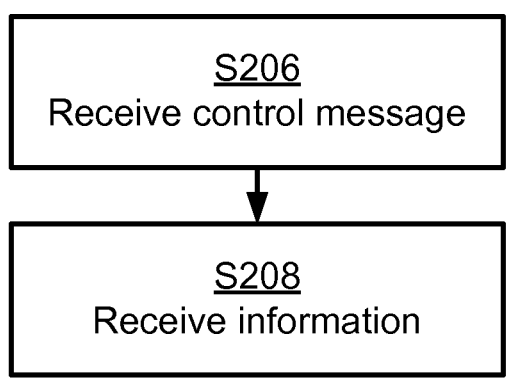

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

FIG. 1 is a schematic diagram illustrating a communications network 100 where embodiments presented herein can be applied. The communications network 100 comprises at least one network node 200. The functionality of the network node 200 and how it interacts with other entities, nodes, and devices in the communications network 100 will be further disclosed below. The communications network 100 further comprises at least one radio access network node 140. The at least one radio access network node 140 is part of a radio access network 110 and operatively connected to a core network 120 which in turn is operatively connected to a service network 130. The at least one radio access network node 140 provides network access in the radio access network 110. A wireless device 300a, 300b served by the at least one radio access network node 140 is thereby enabled to access services and exchange data with the core network 120 and the service network 130.

Examples of wireless devices 300a, 300b include, but are not limited to, mobile stations, mobile phones, handsets, wireless local loop phones, user equipment (UE), smartphones, laptop computers, tablet computers, network equipped sensors, wireless modems, and Internet of Things devices. Examples of radio access network nodes 120 include, but are not limited to, radio base stations, base transceiver stations, NodeBs, evolved NodeBs, access points, and access nodes. As the skilled person understands, the communications network 100 may comprise a plurality of radio access network nodes 120, each providing network access to a plurality of wireless devices 300a, 300b. The herein disclosed embodiments are no limited to any particular number of network nodes 200, radio access network nodes 120 or wireless devices 300a, 300b.

The wireless device 300a, 300b accesses services and exchanges data with the core network 120 and the service network 130 by transmitting data in packets to the core network 120 and the service network 130 and by receiving data in packets from the core network 120 and the service network 130 via the radio access network node 140.

Packet latency has above been identified as degrading network performance. One area to address when it comes to packet latency reductions is the reduction of transport time of data and control signalling, by addressing the length of a transmission time interval (TTI). In LTE release 8, a TTI corresponds to one subframe (SF) of length 1 millisecond. One such 1 ms TTI is constructed by using 14 OFDM or SC-FDMA symbols in the case of normal cyclic prefix and 12 OFDM or SC-FDMA symbols in the case of extended cyclic prefix.

The embodiments disclosed herein relate to mechanisms for allocating resource to a wireless device 300a. In order to obtain such mechanisms there is provided a network node 200, a method performed by the network node 200, a computer program product comprising code, for example in the form of a computer program, that when run on processing circuitry of the network node 200, causes the network node 200 to perform the method.

The embodiments disclosed herein further relate to mechanisms for receiving allocation of resource from a network node 200. In order to obtain such mechanisms there is further provided a wireless device 300a, 300b, a method performed by the wireless device 300a, 300b, and a computer program product comprising code, for example in the form of a computer program, that when run on processing circuitry of the wireless device 300a, 300b, causes the wireless device 300a, 300b to perform the method.

According to embodiment disclosed herein the TTIs are shortened by introducing shortened subframes (below denoted short subframes). With a short TTI, the subframes can be decided to have any duration in time and comprise resources on a number of OFDM or SC-FDMA symbols within a 1 ms subframe. As one example, the duration of a short subframe may be 0.5 ms, i.e., seven OFDM symbols or SC-FDMA symbols for the case with normal cyclic prefix.

As mentioned, one way to reduce latency is to reduce the transmission time interval (TTI), and instead of assigning resources with a time duration of 1 ms, there is then a need to assign resources with shorter duration such as a number of OFDM symbols or SC-FDMA symbols. This implies a need for device specific control signalling that enables indication of such short scheduling assignments.

Using scheduling with 1 ms TTIs, the wireless devices 300a, 300b are allocated frequency resources based on, e.g., bitmaps in DCI fields identifying used resource blocks. As the TTI length is shortened, this may lead to an increased signaling overhead if the allocation is specified several times per subframe. Having a grant only to a single wireless device 300a, 300b per such short TTI will limit the overhead. It might be further beneficial to share the frequency resources within a short TTI between several wireless device 300a, 300b, while limiting the amount of control overhead.

A wireless device 300a, 300b can be configured for short TTI operation by being assigned a group short TTI Radio Network Temporary Identifier (RNTI). The wireless device 300a, 300b could then searches the common to search space (CSS) of the PDCCH for slow grants (comprising a slow Downlink Control Information (DCI) message) scrambled with the short TTI RNTI. This slow grant comprises the frequency allocation for a downlink (DL) and an uplink (UL) short TTI frequency band to be used for short TTI operation. After decoding such a slow grant the wireless device 300a, 300b is in short TTI operation and can extend its search space to an in-band control channel, also defined by the slow grant.

A DCI message is encoded onto a number of Control Channel Elements (CCEs) in the PDCCH region of the DL subframe. The wireless device 300a, 300b searches both in a CSS and a device-specific search space (USS; where U is short for UE as in User Equipment) in the PDCCH for different CCE aggregation levels (AL). The number PDCCH candidates of different sizes in LTE are given in Table 9.1.1-1 in 3GPP TS 36.213 v13.1.1. According to this table there are 22 PDCCH candidates to be monitored by the wireless device 300a, 300b, and with 2 different DCI sizes defined for each transmission mode, there are a total of 44 possibilities that the wireless device 300a, 300b has to try with blind decoding.

In legacy LTE the wireless device 300a, 300b monitors a predefined USS for the PDCCH. With the introduction of a new in-band control channel (below denoted short PDCCH) the number of blind decoding attempts will increase for a wireless device 300a, 300b in short TTI operation. At the same time this wireless device 300a, 300b need the USS for any legacy TTI UL grants or DL allocations.

The term short TTI (sTTI) is used to denote a TTI of a short subframe. The short subframe can have a shorter duration in time than 1 ms. The short TTI can be defined as being shorter than the interval between two consecutive PDCCH transmissions (as being transmitted once every 1 ms). To achieve latency reduction the networks node 200 can thus be configured to schedule data on short timeframes, such as at short TTI level.

The control channel will take up a large percentage of the resources when the TTI becomes smaller with the introduction of shorter TTIs in downlink. Reducing the overhead of control channel can result in a performance increase when short TTIs are used. The herein disclosed embodiments enable efficient minimization of the overhead of the control channel by structuring the total available search space across wireless device 300a, 300b so that the signaling to the device 300a, 300b to indicate unused CCEs is minimized.

This is achieved by the introduction of a CCE group and associated signaling to indicate whether or not a specific CCE group is utilized or not.

Figure 5:
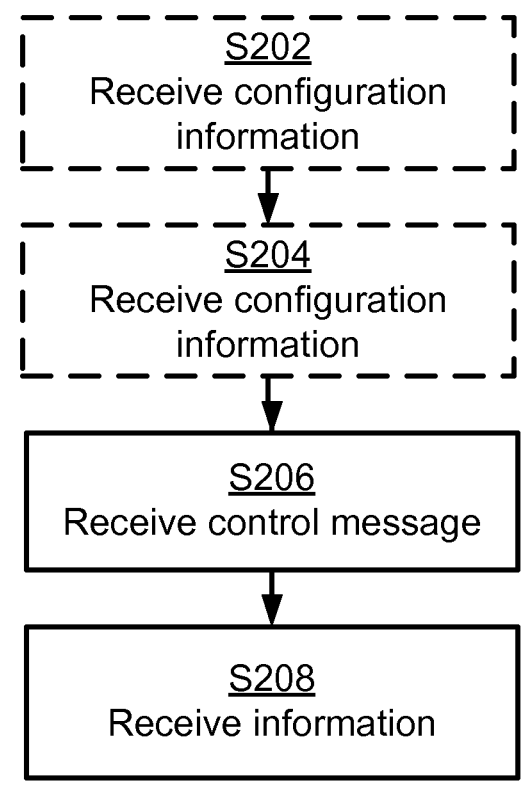

FIGS. 2 and 3 are flow charts illustrating embodiments of methods for allocating resources to a wireless device 300a as performed by the network node 200. FIGS. 4 and 5 are flow charts illustrating embodiments of methods for receiving allocation of resources from a network node 200 as performed by the wireless device 300a, 300b. The methods are advantageously provided as computer programs 1020a, 1020b (see below).

Reference is now made to FIG. 2 illustrating a method for allocating resources to a wireless device 300a as performed by the network node 200 according to an embodiment.

S104: The network node 200 transmits a control message in a search space to the wireless device 300a. The search space comprises at least two groups of CCEs. One of the groups of CCEs comprises the control message.

S106: The network node 200 transmits information to the wireless device 300a indicating that at least one of the groups of CCEs comprises resources for the wireless device 300a.

Embodiments relating to further details of allocating resources to a wireless device 300a will now be disclosed.

Reference is now made to FIG. 3 illustrating methods for allocating resources to a wireless device 300a as performed by the network node 200 according to further embodiments. It is assumed that steps S104, S106 are performed as disclosed with reference to FIG. 2 and a repeated description of these steps is therefore omitted. The method features may be carried out in any order.

According to an embodiment the network node 200 configures the wireless device 300a with the size of the CCEs. Hence, according to an embodiment the network node 200 is configured to perform step S102:

S102: The network node 200 transmits configuration information indicating a size of each group of CCEs. The configuration information can be transmitted in radio resource control (RRC) signalling, or in a Physical Downlink Control Channel (PDCCH).

If the size is set in PDCCH, it can be determined according to the known number of active wireless devices 300a, 300b served by the network node 200 and their required aggregation level (AL). Especially, if there are relatively few wireless devices 300a, 300b, then the short PDCCH region can be reduced to include fewer positions for a given AL. An alternative to this approach is that the size of the groups of CCEs is fixed according to a specification. Each group of CCEs could correspond to a short PDCCH region.

Reference is now made to FIG. 4 illustrating a method for receiving allocation of resources from a network node 200 as performed by the wireless device 300a, 300b according to an embodiment.

As disclosed above, the network node 200 in step S104 transmits a control message to the wireless device 300a. It is assumed that the wireless device 300a receives this control message. Hence, the wireless device 300a, 300b is configured to perform step S206:

S206: The wireless device 300a receives a control message in a search space from the network node 200. The search space comprises at least two groups of CCEs. One of the groups of CCEs comprises the control message.

As disclosed above, the network node 200 in step S106 transmits information to the wireless device 300a. It is assumed that the wireless device 300a receives this information. Hence, the wireless device 300a, 300b is configured to perform step S208:

S208: The wireless device 300a receives information from the network node 200, the information indicates that at least one of the groups of CCEs comprises resources for the wireless device 300a, 300b. For example, the information indicates to the wireless device which of the groups comprises resources for the wireless device. The wireless device determines the group comprising resources (e.g. the group comprising a relevant a control message or data message) from the received indication. The determination of the group of CCEs provides for the wireless device to efficiently find (i.e. decode) the resources for the wireless device (e.g. containing a control message or data).

Reference is now made to FIG. 5 illustrating methods for receiving allocation of resources from a network node 200 as performed by the wireless device 300a, 300b according to further embodiments. It is assumed that steps S206, S208 are performed as disclosed with reference to FIG. 4 and a repeated description of these steps is therefore omitted.

As disclosed above, the network node 200 in an embodiment configures the wireless device 300a. Hence, according to an embodiment the wireless device 300a, 300b is configured to perform step S202:

S202: The wireless device 300a, 300b receives configuration information indicating a size of each group of CCEs. As disclosed above, the configuration information can be received in RRC signalling, or in a PDCCH.

Further, the wireless device 300a, 300b can receive further information and hence according to an embodiment the wireless device 300a, 300b is configured to perform step S204:

S204: The wireless device 300a, 300b receives configuration information, for example, indicating a start position of the resources within the groups of CCEs.

Embodiments relating to further details of allocating resources to a wireless device 300a as performed by the network node 200 and receiving allocation of resources from a network node 200 as performed by the wireless device 300a, 300b will now be disclosed.

Several groups of CCEs can be defined. Each such group includes at least one position per AL. One position can be reused for several ALs. A CCE group thus contains sufficient resources for the maximum aggregation level.

FIG. 6 illustrates the concept of a CCE group. The CCE group may comprise a message comprising one of a plurality of possible aggregation levels. The CCE group are CCE resources (e.g. physical resources) which may be used for control or data messages to/from a wireless device and the radio access network 110. The CCE group does not contain different messages containing all the plurality of different aggregation levels, but may contain one or more message (e.g. control message), each message having an aggregation level. A remainder of resources (illustrated as space to the right of the hashed message), is unused by a control message. For instance, if AL 2 of a CCE group is used for sending a control message (e.g. the fast DCI), some resources remain unused in this CCE group. If AL 4 is used instead, all resources of the CCE group are used. In the following it will be demonstrated how to exploit the unused resources for data transmission. Although the CCE group is defined up to AL 4, the herein disclosed embodiments allow the CCE group to be extended to any AL, e.g. for example up to AL 8 or 16. The maximum AL can also be reduced in size down to AL 2.

A plurality of CCE groups is defined in the resources of a control channel (e.g. PDCCH). The CCE group may be considered as a group of resources (i.e. CCEs or physical layer resources) which can accommodate a message (e.g. a control message) up to a maximum aggregation level. The CCE group may alternatively accommodate one or more message (e.g. a control message) of a smaller aggregation level. In some examples, the message (e.g. a control message) for different aggregation levels starts at a same position, i.e. position is independent of aggregation level.

There are multiple ways of mapping CCEs to individual resource elements. One way is to reuse the mapping from the control channel (e.g. PDCCH), but contained within the short TTI bandwidth. Another way is to allocate the CCEs to REGs that are assigned within a limited set of PRBs and not spread over the whole allocated frequency bandwidth. An example of such an allocation is EPDCCH. For short TTI operation it may however be beneficial to spread out the short PDCCH more in frequency than EPDCCH and also to allow the short PDSCH on the same frequency resources within the short TTI. However the short PDCCH allocation can still be kept localized in the sense that it is only allocated to a limited set of PRBs and not randomized over a large frequency bandwidth.

According to an embodiment, the wireless device 300a, 300b and network node 200 use a single start position for messages of all aggregation levels in a CCE group. As such, messages with different AL start at a same position in the search space for a particular CCE group. In this case, the search space is common to all wireless devices 300a, 300b.

FIG. 7 gives an example of the control channel (e.g. short PDCCH) search space of the instant embodiment. The search space is comprises 4 CCE groups, each containing a message having 3 possible ALs. Even though the CCE groups are drawn each one after another (e.g. distributed in a time domain), their physical resources can be distributed over the frequency domain (i.e., there may be a gap in between the resources of CCE group n and CCE group n+1, where n is an integer).

To detect a control message (e.g. short PDCCH), a wireless device 300a, 300b may test all CCE groups for all ALs. Alternatively, the wireless device 300a, 300b could test only some of the ALs in each CCE groups if the network node 200 signaled to the wireless device 300a, 300b information about a reduced set of ALs to test. Alternatively, the wireless device 300a, 300b could test all ALs in only some of the CCE groups if the network node 200 signals this to the wireless device 300a, 300b. This means that even though the search space is common to more than one wireless device 300a, 300b, the network node 200 can reduce the search space on a device-specific basis.

Resource Usage Optimization:

As described above, if a low AL is used for the fast DCI, some resources of the CCE group remain unused. In the an embodiment, the wireless device 300a, 300b may determine that unused resources in the CCE group where its control message (e.g. specific to that wireless device 300a, e.g. fast DCI) was sent with low AL (i.e. less than maximum AL) are used for its own data message or allocation (e.g. short PDSCH). For example, if AL 2 is used for the fast DCI and the CCE group contains 4 CCEs, two remaining CCEs can be used for the wireless device 300a, 300b short PDSCH REs.

The resources used for short PDSCH can for example be all the resources available within the own CCE group or the resources that map to the same frequency allocation for which short PDSCH is allocated on. To further optimize the unused short PDCCH resources, a bitmap of x−1 bits can be signaled to the wireless device 300a, 300b in the device-specific control message (e.g. fast DCI), where x is the number of CCE groups in the short PDCCH search space. The bitmap is an example of information transmitted to the wireless device to indicate resources for the wireless device. Such a bitmap could inform the wireless device 300a, 300b that resources in other CCE groups can be used for its own data resources, for example, downlink data allocation (e.g. short PDSCH).

FIG. 8 schematically illustrates an example with a search space of 4 CCE groups. A control message (e.g. fast DCI) is received in CCE group 3 for a first wireless device denoted UE1. UE1 may be configured to determine that the remaining resources in CCE group 3 which are not occupied by the fast DCI are used for short data for UE1 (e.g. PDSCH). UE1 may be configured to make this determination without receiving any further signalling. The decoded control message (e.g. fast DCI) could comprise a bitmap with value 111. The wireless device 300a, 300b could then determine that the resources in CCE group 1, 2, and 4 are used for its data (e.g. short PDSCH). Other ways or methods of indicating the information other than using a bitmap can be used to signal the information to wireless devices 300a, 300b, to use the resources in the same or different CCE group.

In the above example, the resource usage is optimized by using unused resources of a group (empty CCEs) for the short PDSCH to increase the capacity for downlink data transmissions. Using empty CCEs for the downlink data transmissions (e.g. short PDSCH) also indicates that power needs to be allocated to these CCEs, which might imply that no power boosting can be performed on the short PDCCH to further enhance the short PDCCH transmissions. Therefore, there is a tradeoff on how to use the empty CCEs; to increase the capacity for data transmission or to enhance the short PDCCH transmission. The empty CCEs can also be used to coordinated inter-cell interference.

In the above example the network node 200 has only scheduled a single wireless device 300a, 300b on a control channel for operating with a short TTI (e.g. short PDCCH). However the resources used for the downlink data transmission e.g. short PDSCH within the control channel region (e.g. short PDCCH region) can, for example, be all the resources available resources that are indicated to be free, or, the resources that map to the same frequency allocation for which the data channel (e.g. short PDSCH) is allocated on and also indicated as free.

Figure 9:
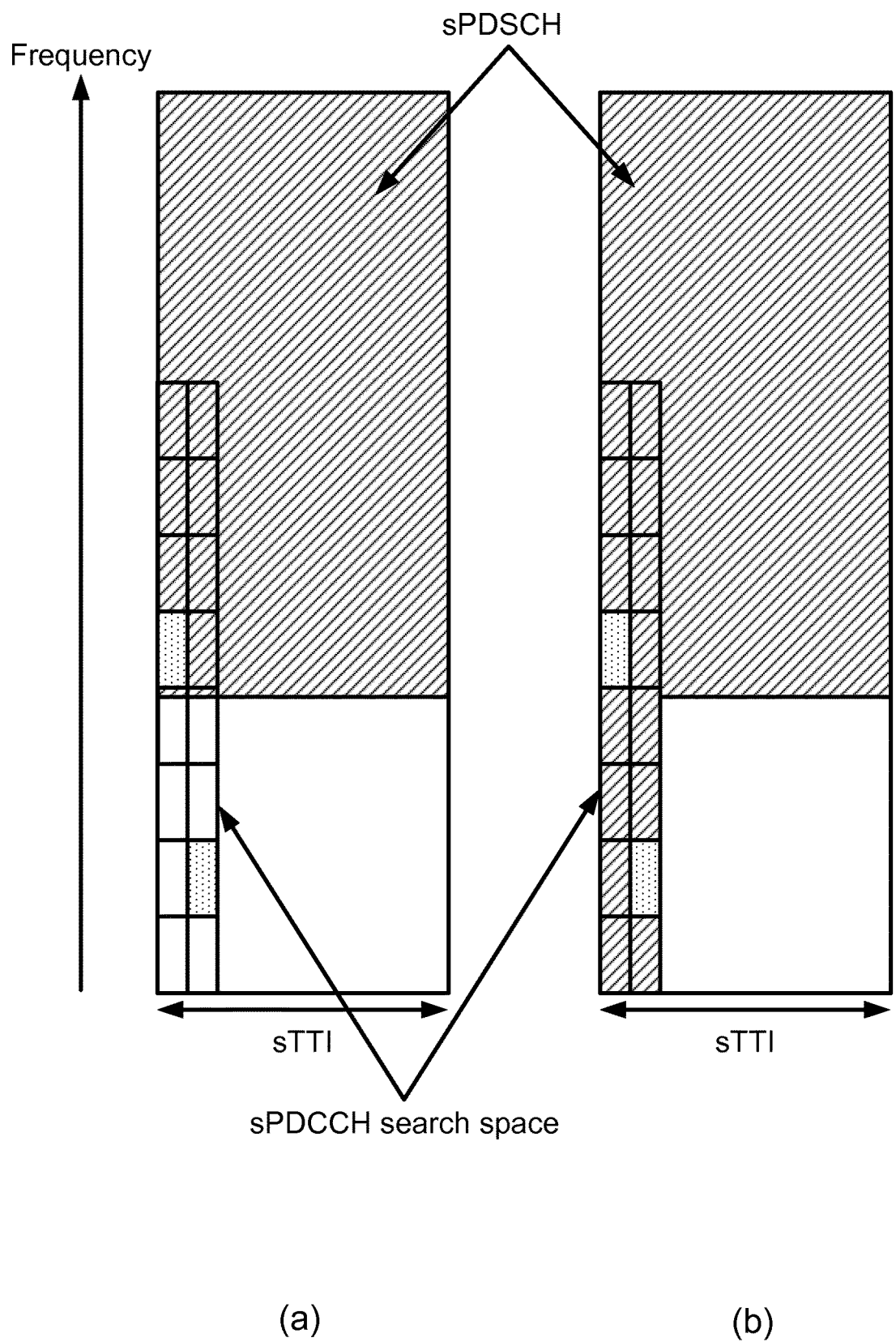

FIG. 9 illustrates an example of control and data channel allocations, for example, when operating in a sTTI operation (e.g. short PDCCH and short PDSCH allocation). FIG. 9(a) shows use of data on resources that map to the same frequency allocation for which the data channel. FIG. 9(b) shows use by a wireless device of all the resources (i.e. available resources) that are indicated to be free for data, in both the data channel and the unused resources of the control channel, in a short TTI operation.

References to short PDCCH may be considered as an example of a control channel, and references to short PDSCH may be considered as an example of a data channel, downlink data channel or downlink data transmission, in a short TTI operation. The short refers to operation with a short TTI (less than one subframe or 1 ms). References to a fast DCI may be considered as an example of a control message which is specific to a particular wireless device. A slow DCI may be considered as an example of a control message which is common to a plurality of wireless devices and/or provides information on the frequency band used for short TTI operation.

In FIG. 9, the short PDCCH search space is composed of 4 CCE groups of 4 CCEs each. Each box labelled as sPDCCH search space indicates a CCE, and the grid of 16 boxes (CCEs) is the control channel search space comprising control information. The search space extends in the frequency domain and the time domain. In this example, the wireless device 300a (UE1) uses AL 2 of CCE group 3, so two CCEs of group 3 are occupied by the downlink fast DCI of UE1. These CCEs are represented with dotted boxes and are distributed over the entire sPDCCH time-frequency region according to a mapping function that is known to the wireless device 300a and the network node 200.

The downlink fast DCI of wireless device 300a sent in a short PDCCH indicates a short PDSCH allocation for wireless device 300a identified by a hatched region in FIG. 9(a). With a bitmap in the fast DCI with value 111, the wireless device 300a could use all unoccupied resources of the short PDCCH search space. In a first case, since the short PDSCH frequency allocation for the wireless device 300a does not cover the entire short PDCCH search space, the wireless device 300a could assume that only the allocated frequency resources that overlap with short PDCCH resources signaled as free are used for its short PDSCH.

Thus, in FIG. 9(a), only the short PDCCH resources that overlap with the hatched region and are signaled as free in the bitmap are used for the short PDSCH, i.e. for data. In a second case, the wireless device 300a assumes that the short PDSCH frequency allocation is extended (e.g. extended in frequency) with the short PDCCH resources signaled as free in the bitmap. This results in the hatched region shown in FIG. 9(b). It is possible to achieve the hatched region in FIG. 9(b) using the first case based on scheduling from the network node 200. The network node 200 then has to make sure to schedule the short PDSCH so that it completely overlaps with the short PDCCH region in the first few symbols of the sTTI.

This embodiment is efficient for data resources left unused by short PDCCH in the short PDCCH search space in case wireless devices 300a, 300b in downlink are scheduled (by a fast DCI message for downlink data transmission).

FIG. 10 illustrates a scenario where the fast DCI comprises a grant for uplink data transmission, such as in CEE group 1 for the wireless device denoted UE 2 and CCE group 2 for the wireless device denoted UE3. The resources left empty in CCE group 1 and group 2 cannot be exploited by UE2 and UE3 since they have uplink traffic and not downlink traffic. CCE group 1 and CCE group 2 cannot either be signaled as empty to the wireless device denoted UE1 which has downlink traffic if a bitmap of x–1 bits is used for the signaling.

To avoid this issue, more information can be provided to the wireless device 300a, 300b, e.g. more bits can be added to the bitmap. In order to fully optimize the resource usage, a bitmap of (z–1)·n bits can be needed, where z is the number of CCE groups, and n is the smallest value such that 2n is larger than or equal to the number of supported ALs.

Consider the CCE group defined in FIG. 6, a bitmap table can be defined to indicate the usage of the CCEs for sPDCCH within this group as in Table 1. Based on Table 1, by signaling a bitmap of "101011" to UE1, the empty CCEs in CCE group 1 and CCE group 2 can also be used by UE1 for downlink data transmission.

TABLE 1

Bitmap table for example in FIG. 6.

| Usage of CCEs indicator bit field | Meaning |
|---|---|
| 00 | CCEs in $AL_4$ defined in this CCE group are used for short PDCCH, no CCE is left for short PDCCH |
| 01 | CCEs in $AL_1$ defined in this CCE group are used for short PDCCH, the rest of the short PDCCH can be used for short PDCCH |
| 10 | CCEs in $AL_2$ defined in this CCE group are used for short PDCCH, the rest of the CCEs can be used for short PDCCH |
| 11 | No CCEs are used for short PDCCH, and all CCEs in this CCE group can be used for short PDCCH |

According to an embodiment, several start positions are defined for at least some of the ALs per CCE group. For example, the relatively low ALs have a plurality of start positions for a control message defined. FIG. 11 shows an example with two possible start positions for AL1 and AL 2 for each CCE group. In this example, a second start position is the same for a plurality of aggregation levels (e.g. AL1 and AL2).

According to this embodiment, active wireless devices 300a, 300b are configured with non-overlapping start positions. For instance, a first wireless device 300a can be configured with positions 1 whilst a second wireless device 300b can be configured with the positions 2 in each CCE group. The same position for AL 4 is used for both wireless devices 300a, 300b, assuming that AL 4 is the maximum available AL. This is illustrated in FIG. 11. The configuration of which positions to use can either be signaled using a higher layer signalling (e.g. over RRC) or over PDCCH (e.g. using a slow DCI message). The configuration can be signaled over PDCCH in order to update the usage of positions 1 and 2 based on the active wireless devices 300a, 300b at a given time.

All positions represented in FIG. 11 are part of the common search space. All wireless devices 300a, 300b know the existence of all positions, but at a given time they are configured to test only one or only a subset of positions for the control message, e.g. "positions 1" or only the "positions 2". More than one wireless device 300a, 300b can be configured to monitor "positions 1" as well. For instance, the downlink assignment for one wireless device 300a can be signaled using position 1 of CCE group 3 while the downlink assignment for another wireless device 300b can be signaled using position 1 of CCE group 4. Both these wireless devices 300a, 300b will need to test all positions 1 in all CCE groups to find their assignment (unless the network node 200 informs about a reduced set). The wireless device is configured to determine the position in a CCE group by signalling, based on another received message or using a predetermined value.

Resource usage optimization: Similarly as in the above embodiment, a information (e.g. a bitmap) can be signaled to the wireless device 300a, 300b to inform about the usage of other CCE groups for its short PDSCH. In the instant embodiment the bitmap could also include further information (e.g. an additional) bit for the CCE group used for the fast DCI message for the wireless devices 300a, 300b. This additional bit then indicates if the remaining resources of the CCE group where the fast DCI was decoded is used for its short PDSCH.

Figures 12, 13, 14:
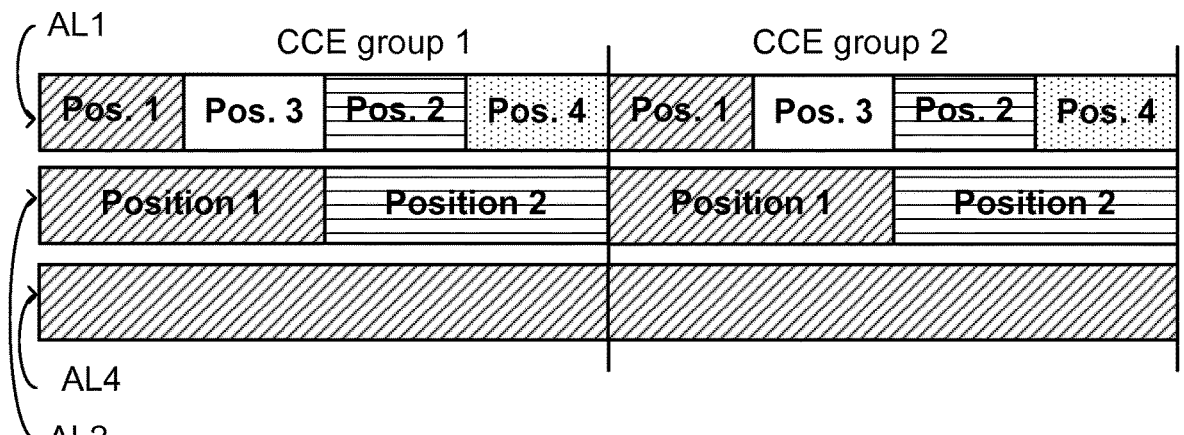

FIG. 12 gives an example assuming 4 CCE groups and that the wireless device denoted UE1 has received its fast DCI message in CCE group 3 and that the fast DCI message comprises a bitmap with value 1100. As noted above, some other way than using a bitmap can be used to signal the information to wireless devices 300a, 300b to use the resources in the same or different CCE group. The wireless device denoted UE1 should thus assume that the resources in CCE group 1 and 2 are used for its short PDSCH whilst resources in CCE groups 3 and 4 are not. The remaining resources in CCE group 3 used for sending the fast DCI message to UE1 are used for sending a fast DCI message to a different wireless device. The wireless device denoted UE2 has received its fast DCI in CCE group 3 and it comprises a bitmap with value 0001.

In the above example the network node 200 has only scheduled a single wireless device 300a, 300b on short PDCCH. However the resources used for short PDSCH within the short PDCCH region can, for example, be all the resources available resources that are indicated to be free or the resources that map to the same frequency allocation for which short PDSCH is allocated on and also indicated as free.

One way to reduce the bitmap size is to configure each wireless device 300a, 300b to monitor only a subset of the CCE groups. For example, one wireless device 300a can be configured to test only CCE group 1 and 2 and another wireless device 300b can be configured to test only CCE group 3 and 4. The downlink assignment for wireless device 300a can be signaled using position 1 of CCE group 1 while the downlink assignment for wireless device 300b can be signaled using position 1 of CCE group 4. In this case, the empty CCEs in group 1 and 2 are used for the short PDSCH for wireless device 300a, and the empty CCEs in group 3 and 4 are used for the short PDSCH for wireless device 300b, without a need of a bitmap.

An embodiment enables the fast DCI transmission for wireless devices 300a, 300b scheduled in uplink such that these wireless devices 300a, 300b do not occupy a dedicated CCE group. As described in the previous embodiment, a CCE group used only for uplink grant prevents the usage of the remaining resources of this CCE group for the short PDSCH of other wireless devices.

In FIG. 13, the wireless device denoted UE1 is scheduled in downlink, whilst the wireless devices denoted UE2 and UE3 are scheduled in uplink. UE 2 and UE 3 are configured such that UE2 uses positions 1 in the CCE group whilst UE 3 uses positions 2. In this way, the uplink fast DCI message for UE 2 and UE3 can be sent in the same CCE group without overlapping if a low AL is used. The unused resources of the short PDCCH search space are thus better exploited for the downlink wireless device, i.e., UE1, in FIG. 13 than in FIG. 10.

The instant embodiment can be extended to include even more start positions per CCE group. This is shown in FIG. 14. Consequently, the configuration of which position to use would need a higher number of bits. In this example, start positions may depend on the aggregation level.

Figure 15:
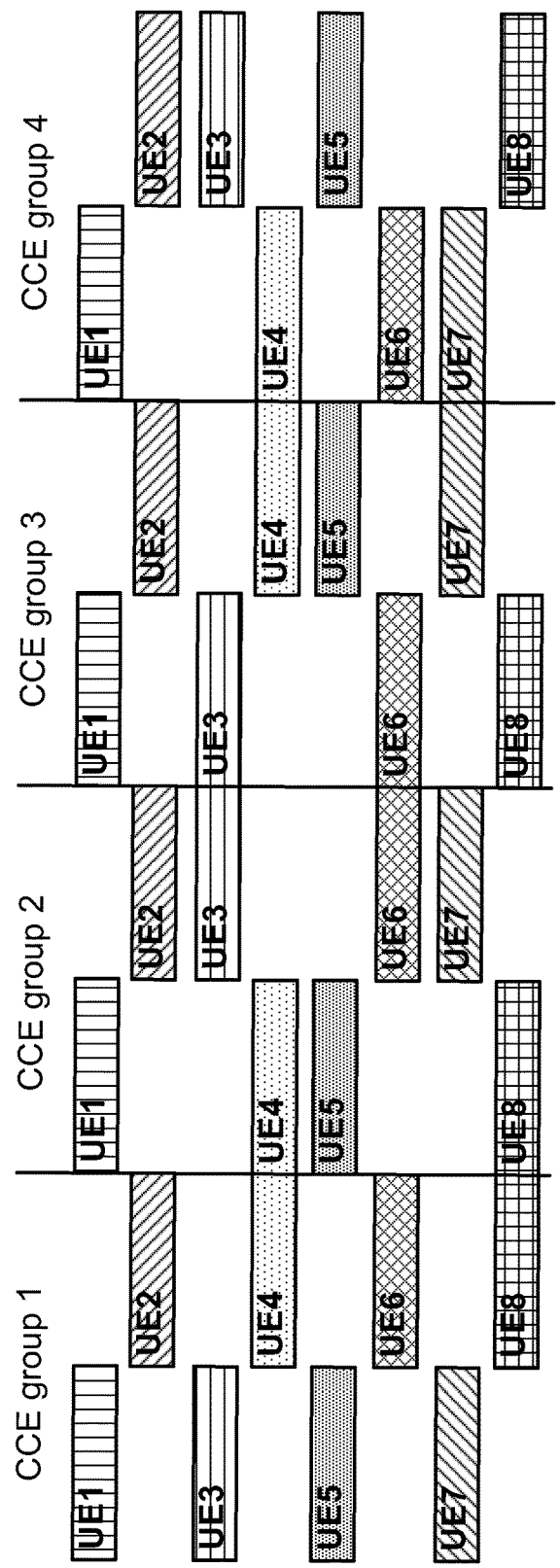

An alternative to FIGS. 11 and 14, where the start positions are identical for all CCE groups, and where these start positions might need to be explicitly configured, is shown in FIG. 15. FIG. 15 illustrates an example where start positions for different wireless devices 300a, 300b are different between different CCE groups, in order to allow arbitrary combinations of two wireless devices 300a, 300b to be sent fast DCI in the same CCE group. Only AL 2 shown in this example. In this example, any two wireless devices 300a, 300b can receive fast DCI in at least one common CCE group, without explicit control signaling.

Figure 16:
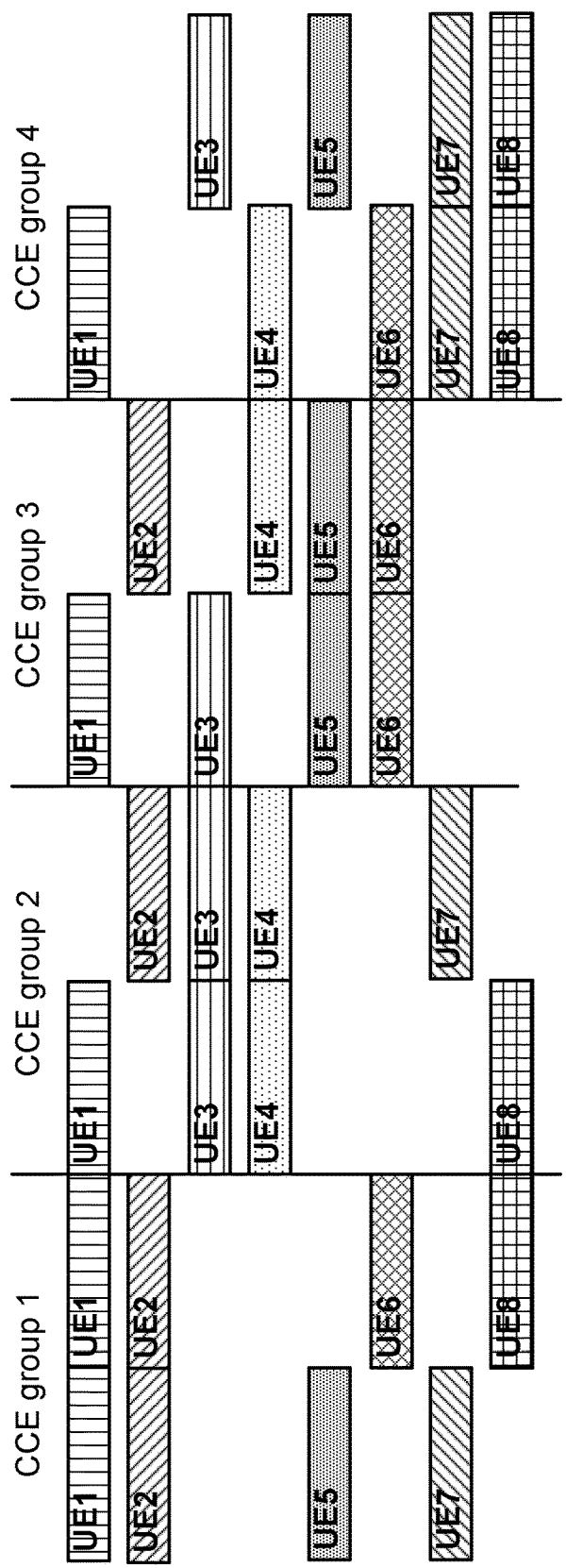

In FIG. 15, at least two CCE groups can be found allowing any combination of two different wireless devices 300a, 300b to receive DCI messages. One would be the minimum requirement. In FIG. 16 a different configuration is presented, allowing the same wireless device 300a, 300b to receive DCI messages in the same CCE group.

FIG. 16 illustrates and example similar to FIG. 13, but where it is possible to place two fast DCI messages for the same wireless device 300a, 300b in the same CCE group. This can be beneficial if it is desired to transmit two AL2 messages to the same wireless device 300a, 300b. To keep the total number of positions low, each wireless device 300a, 300b can here only read CCE messages in three of the four CCE groups. This would then increase the number of positions, as e.g. the wireless devices denoted UE1 and UE2 now searches for two starting positions in CCE group 1. To limit the total number of start positions for each wireless device 300a, 300b, in this example, each wireless device 300a, 300b is configured to only search a subset of the CCE groups, e.g. 3 out of the 4 CCE groups. It is still possible to find combinations between any two wireless devices 300a, 300b in at least one CCE group, compared to before the removal, where at least two CCE groups could be found for each combination of different wireless devices 300a, 300b (as in FIG. 15).

According to a further embodiment it is provided that if the wireless device 300a, 300b can determine (e.g. make an assumption) the used aggregation level across CCE groups it is possible for the wireless device 300a, 300b when scheduled in downlink to utilize more of the available resources. For example the wireless device 300a, 300b can be signaled the bit field indicating whether or not each corresponding CCE group is free. Using this information together with knowing the AL the wireless device 300a, 300b decoded its own DL assignment on, the wireless device 300a, 300b can then utilize the corresponding unused resources for short PDSCH if assigned to do. The assignment can be based on the indication that the resources are free (i.e. unused by another wireless device) or that they are free and within the allocated frequency resources for short PDSCH.

A summary of the above disclosed embodiments applicable to both the methods performed by the network node 200 and the wireless device 300a, 300b will now be provided.

According to an embodiment the information only indicates groups of CCEs not comprising the control message. Further aspects of this embodiment will now be disclosed.

The same wireless device 300a can receive two DCI messages in the same CCE group. Hence, according to an embodiment the control message is provided in one of the groups of CCEs, and a further control message for the wireless device also is provided in the above-specified one of the groups of CCEs.

A reduction in number of starting positions can be achieved by each wireless device 300a, 300b being configured to only monitor a reduced number of CCEs. Hence, according to an embodiment only less than all of the groups of CCEs are allowed to comprise said control message and/or said resources for the wireless device.

As disclosed above, the information transmitted in step S106 and received in step S208 can be defined by a bitmap. Such a bitmap could indicate one or more CCE groups comprising a data message and/or one or more CCE groups comprising a control message for the wireless device 300a.

According to some aspects there are different ALs of CCEs in each group. Hence, according to an embodiment each group of CCEs has a size to contain CCEs of at least two aggregation levels, AL. One of the at least two ALs can be a maximum AL.

There are different types of resources. According to an embodiment the resources are downlink resources. The downlink resources could be resources used for a short Physical Downlink Shared Channel (PDSCH).

For example, the wireless device 300a could determine that resources in a CCE group contains the control message for the wireless device 300a, and that resources which are unused for the control message comprise an allocation for a data message. The allocation for a data message could be a downlink assignment (i.e., a short PDSCH).

There are different types of information transmitted in step S106 and received in step S208. According to an embodiment this information comprises an indication of at least one of the groups of CCEs comprising the control message and/or a data message for the wireless device 300a.

There are different types of control messages transmitted in step S104 and received in step S106. According to an embodiment the control message is a downlink assignment or an uplink grant. For example the control message could be Downlink Control Information (DCI), and/or the search space could be a control channel comprising CCEs, and/or the control channel could be a PDCCH. The control message transmitted in step S104 and received in step S206 can be specific to the wireless device 300a.

Resources in CCE groups not used by the wireless device 300a could be used for resources to other wireless devices 300b. Hence, according to an embodiment any group of CCEs unused for resources for the wireless device 300a comprises at least one of resources and a control message for at least one other wireless device 300b.

According to an embodiment the wireless device 300a is operating with a short TTI, and the control message is be a second control message, wherein the wireless device 300a further receives a first control message indicating a frequency band for the short TTI operation. The first control message can be a slow DCI message and the second control message can be a fast DCI message. The slow DCI message could be in a common search space and the fast DCI could be in a device-specific search space.

A start position of a control message in a CCE group could be common to control messages of different Aggregation Levels.

The wireless device 300a could be the only wireless device receiving the control message in a CCE group, or, the wireless device 300a shares the CCE group with one or more further wireless devices 300b. Additionally or alternatively, a plurality of wireless devices 300a, 300b could share a CCE group to each receive an uplink grant.

Figure 17:
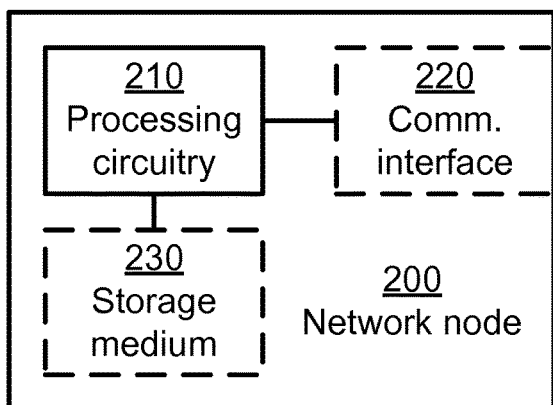
FIG. 17 is a schematic diagram showing functional units of a network node according to an embodiment.

FIG. 17 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010a (as in FIG. 21), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, S102-S106, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network node 200 may further comprise a communications interface 220 for communications at least with a wireless device 300a, 300b. As such the communications interface 220 may comprise one or more transmitters and receivers, comprising analogue and digital components and a suitable number of antennas for wireless communications and ports for wireline communications.

The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 18:
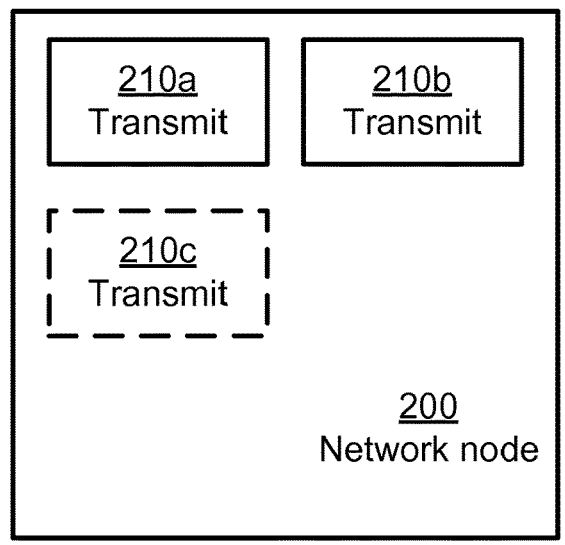
FIG. 18 is a schematic diagram showing functional modules of a network node according to an embodiment.

FIG. 18 schematically illustrates, in terms of a number of functional modules, the components of a network node 200 according to an embodiment. The network node 200 of FIG. 18 comprises a number of functional modules; a transmit module 210a configured to perform step S104, and a transmit module 210b configured to perform step S106. The network node 200 of FIG. 18 may further comprise a number of optional functional modules, such as a transmit module 210c configured to perform step S102. In general terms, each functional module 210a-210c may be implemented in hardware or in software. Preferably, one or more or all functional modules 210a-210c may be implemented by the processing circuitry 210, possibly in cooperation with functional units 220 and/or 230. The processing circuitry 210 may thus be arranged to from the storage medium 230 fetch instructions as provided by a functional module 210a-210c and to execute these instructions, thereby performing any steps of the network node 200 as disclosed herein.

The network node 200 may be provided as a standalone device or as a part of at least one further device. For example, the network node 200 may be provided in a node of the radio access network 110 or in a node of the core network 120. For example, the network node 200, or at least its functionality, could be implemented in a radio base station, a base transceiver station, a NodeBs, an evolved NodeBs, an access points, or an access node. Alternatively, functionality of the network node 200 may be distributed between at least two devices, or nodes. These at least two nodes, or devices, may either be part of the same network part (such as the radio access network 110 or the core network 120) or may be spread between at least two such network parts. In general terms, instructions that are required to be performed in real time may be performed in a device, or node, in the radio access network 110.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 17 the processing circuitry 210 may be distributed among a plurality of devices, or nodes. The same applies to the functional modules 210a-210c of FIG. 18 and the computer program 1020a of FIG. 21 (see below).

Figure 19:
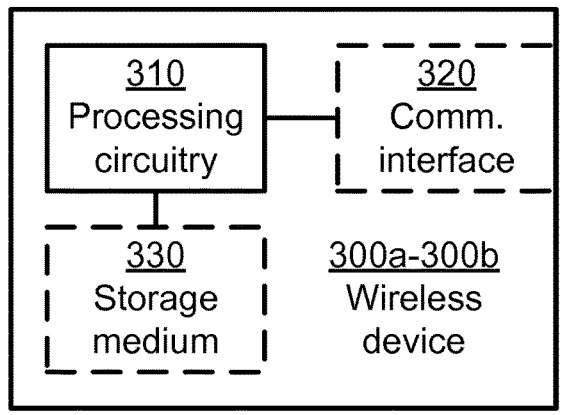
FIG. 19 is a schematic diagram showing functional units of a wireless device according to an embodiment.

FIG. 19 schematically illustrates, in terms of a number of functional units, the components of a wireless device 300a, 300b according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1010b (as in FIG. 21), e.g. in the form of a storage medium 330. The processing circuitry 310 may further be provided as at least one application specific integrated circuit (ASIC), or field programmable gate array (FPGA).

Particularly, the processing circuitry 310 is configured to cause the wireless device 300a, 300b to perform a set of operations, or steps, S202-S208, as disclosed above. For example, the storage medium 330 may store the set of operations, and the processing circuitry 310 may be configured to retrieve the set of operations from the storage medium 330 to cause the wireless device 300a, 300b to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The wireless device 300a, 300b may further comprise a communications interface 320 for communications at least with a network node 200. As such the communications interface 320 may comprise one or more transmitters and receivers, comprising analogue and digital components and a suitable number of antennas for wireless communications and ports for wireline communications.

The processing circuitry 310 controls the general operation of the wireless device 300a, 300b e.g. by sending data and control signals to the communications interface 32o and the storage medium 330, by receiving data and reports from the communications interface 320, and by retrieving data and instructions from the storage medium 330. Other components, as well as the related functionality, of the wireless device 300a, 300b are omitted in order not to obscure the concepts presented herein.

Figure 20:
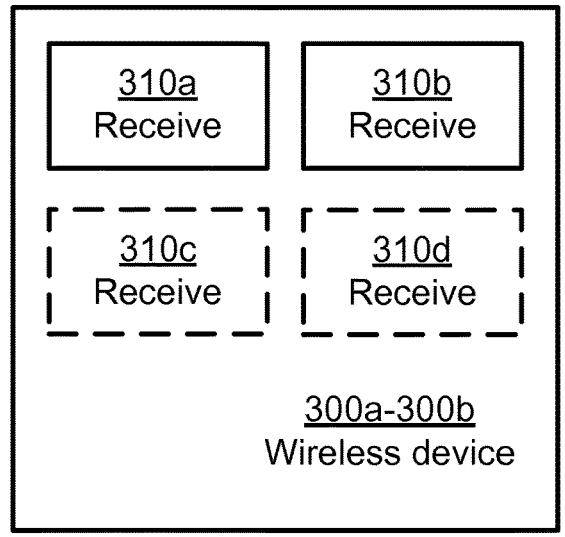
FIG. 20 is a schematic diagram showing functional modules of a wireless device according to an embodiment.

FIG. 20 schematically illustrates, in terms of a number of functional modules, the components of a wireless device 300a, 300b according to an embodiment. The wireless device 300a, 300b of FIG. 20 comprises a number of functional modules; a receive module 310a configured to perform step S206, and a receive module 310b configured to perform step S208. The wireless device 300a, 300b of FIG. 20 may further comprises a number of optional functional modules, such as any of a receive module 310c configured to perform step S202, and a receive module 310d configured to perform step S204. In general terms, each functional module 310a-310d may be implemented in hardware or in software. Preferably, one or more or all functional modules 310a-310d may be implemented by the processing circuitry 310, possibly in cooperation with functional units 320 and/or 330. The processing circuitry 310 may thus be arranged to from the storage medium 330 fetch instructions as provided by a functional module 310a-310d and to execute these instructions, thereby performing any steps of the wireless device 300a, 300b as disclosed herein.

Figure 21:
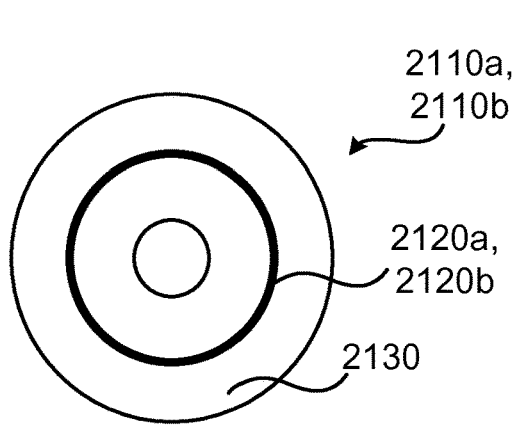
FIG. 21 shows one example of a computer program product comprising computer readable means according to an embodiment.

FIG. 21 shows one example of a computer program product 1010a, 1010b comprising computer readable means 1030. On this computer readable means 1030, a computer program 1020a can be stored, which computer program 1020a can cause the processing circuitry 210 and thereto operatively coupled entities and devices, such as the communications interface 220 and the storage medium 230, to execute methods according to embodiments described herein. The computer program 1020a and/or computer program product 1010a may thus provide means for performing any steps of the network node 200 as herein disclosed. On this computer readable means 1030, a computer program 1020b can be stored, which computer program 1020b can cause the processing circuitry 310 and thereto operatively coupled entities and devices, such as the communications interface 320 and the storage medium 330, to execute methods according to embodiments described herein. The computer program 1020b and/or computer program product 1010b may thus provide means for performing any steps of the wireless device 300a, 300b as herein disclosed.

In the example of FIG. 21, the computer program product 1010a, 1010b is illustrated as an optical disc, such as a CD (compact disc) or a DVD (digital versatile disc) or a Blu-Ray disc. The computer program product 1010a, 1010b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020a, 1020b is here schematically shown as a track on the depicted optical disk, the computer program 1020a, 1020b can be stored in any way which is suitable for the computer program product 1010a, 1010b.

Examples of the disclosure describe transmitting information to the wireless device indicating at least one of the groups of CCEs comprising resources for the wireless device. In further examples, the wireless device determines the group of CCEs without receiving information, e.g. by a predetermined allocation or by determining from a parameter of another message.

References to aggregation level may refer to an aggregation level of a search space (e.g. CSS, USS), aggregation levels of CCEs or an aggregation level of a control message (e.g. a control message formed from aggregated CCEs in a search space).

In some examples a slow grant may be considered as a control message comprising information of a frequency band for short TTI operation of the wireless device. In some examples, the slow grant may be considered as a control message in a CSS, and/or the fast grant may be considered as a control message in a USS. In some examples, a slow grant may be considered as control message transmitted once per subframe, and/or a fast grant may be considered as a control message type which is transmitted (or uses a time resources which allows transmission) a plurality of times per subframe (e.g. once per wireless device in sTTI operation served by a cell).

Any example of control message may also be referred to as a control information message.

An LTE subframe lasting 1 ms contains 14 OFDM symbols for normal CP. A New Radio (5G), NR, subframe may have a fixed duration of 1 ms and may therefore contain a different number of OFDM symbols for different subcarrier spacings. An LTE slot corresponds to 7 OFDM symbols for normal CP. An NR slot corresponds to 7 or 14 OFDM symbols; at 15 kHz subcarrier spacing, a slot with 7 OFDM symbols occupies 0.5 ms. Concerning NR terminology, reference is made to 3GPP TR38.802 v14.0.0 and later versions.

Aspects of the disclosure may be applicable to either LTE or NR radio communications. References to a short TTI may alternatively be considered as a mini-slot, according to NR terminology. The mini-slot may have a length of 1 symbol, 2 symbols, 3 or more symbols, or a length of between 1 symbol and a NR slot length minus 1 symbol. The short TTI may have a length of 1 symbol, 2 symbols, 3 or more symbols, an LTE slot length (7 symbols) or a length of between 1 symbol and a LTE subframe length minus 1 symbol. The short TTI, or mini-slot may be considered as having a length less than 1 ms or less than 0.5 ms.

The inventive concept has mainly been described above with reference to a few embodiments. However, as is readily appreciated by a person skilled in the art, other embodiments than the ones disclosed above are equally possible within the scope of the inventive concept, as defined by the appended claims.

The invention claimed is:

1. A method for allocating resources to a wireless device, the method comprising a network node:
   transmitting configuration information in a Radio Resource Control (RRC) message to the wireless device configuring a search space for the wireless device with at least two groups of Control Channel Elements (CCEs), the configuration information in the RRC message including an indication of unused CCEs within at least one group of CCEs available for sending user data;
   transmitting a control message in one of the groups of CCEs available for sending the user data;
   transmitting a bitmap to the wireless device in Downlink Control Information (DCI) indicating unused resources in one or more CCE groups that are allocated to the wireless device for a data.

2. The method of claim 1, wherein the configuration information indicates a size of each group of CCEs.

3. The method of claim 1, wherein the configuration information only indicates groups of CCEs not comprising the control message.

4. The method of claim 1:
   wherein the control message is provided in one of the groups of CCEs; and
   wherein a further control message for the wireless device also is provided in the one of the groups of CCEs.

5. The method of claim 1, wherein only less than all of the groups of CCEs are allowed to comprise the control message and/or the resources for the wireless device.

6. The method of claim 1, wherein the configuration information is defined by a bitmap.

7. The method of claim 1, wherein each group of CCEs has a size to contain CCEs of at least two aggregation levels (AL).

8. The method of claim 7, wherein one of the at least two ALs is a maximum AL.

9. The method of claim 1, wherein the resources are downlink resources.

10. The method of claim 9, wherein the downlink resources are resources used for a short Physical Downlink Shared Channel (PDSCH).

11. The method of claim 1, wherein the control message is a downlink assignment or an uplink grant.

12. The method of claim 1, wherein:
   the control message is Downlink Control Information;
   the search space is a control channel comprising CCEs; and/or
   the control channel is a physical downlink control channel.

13. The method of claim 1, wherein any group of CCEs unused for resources for the wireless device comprises at least one of resources and a control message for at least one other wireless device.

14. The method of claim 1, wherein the configuration information comprises an indication of at least one of the groups of CCEs comprising the control message and/or a data message for the wireless device.

15. The method of claim 1, wherein the control message is specific to the wireless device.

16. The method of claim 1:
   wherein the wireless device is operating with a short Transmission Time Interval (TTI), and the control message is a second control message;
   wherein the wireless device further receives a first control message indicating a frequency band for short TTI operation.

17. The method of claim 1, wherein a start position of a control message in a CCE group is common to control messages of different Aggregation Levels.

18. The method of claim 1, wherein the wireless device is the only wireless device receiving the control message in a CCE group, or the wireless device shares the CCE group with one or more further wireless devices.

19. The method of claim 1, wherein a plurality of wireless devices share a CCE group to each receive an uplink grant.

20. A method for receiving allocation of resources from a network node, the method comprising a wireless device:
   receiving configuration information in a Radio Resource Control (RRC) message from the network node configuring a search space for the wireless device with at least two groups of Control Channel Elements (CCEs) the configuration information in the RRC message including an indication of unused CCEs within at least one group of CCEs available for sending user data;
   receiving a control message from the network node in one of the groups of CCEs; and
   receiving a bitmap from the network node in Downlink Control Information (DCI) indicating unused resources in one or more CCE groups that are allocated for a data message.

21. The method of claim 20, wherein the configuration information indicates a size of each group of CCEs.

22. The method of claim 20, further comprising receiving configuration information indicating a start position of the resources within the groups of CCEs.

23. The method of claim 20, wherein the wireless device determines that resources in a CCE group containing the control message for the wireless device, and which are unused for the control message, comprise an allocation for a data message.

24. A network node for allocating resources to a wireless device, the network node comprising:
  processing circuitry; and
  memory containing instructions executable by the processing circuitry whereby the network node is operative to:
    transmit configuration information in a Radio Resource Control (RRC) message to the wireless device configuring a search space for the wireless device with at least two groups of Control Channel Elements (CCEs), the configuration information in the RRC message including an indication of unused CCEs within at least one group of CCEs available for sending user data;
    transmit a control message to the wireless device in one of the groups of CCEs; and
    transmit a bitmap to the wireless device in Downlink Control Information (DCI) indicating unused resources in one or more CCE groups that are allocated for a data message.

25. A wireless device for receiving allocation of resources from a network node, the wireless device comprising:
  processing circuitry; and
  memory containing instructions executable by the processing circuitry whereby the wireless device is operative to:
    receive configuration information in a Radio Resource Control (RRC) message from the network node configuring a search space for the wireless device with at least two groups of Control Channel Elements (CCEs), the configuration information in the RRC message including an indication of unused CCEs within at least one group of CCEs available for sending user data;
    receive a control message in one of the groups of CCEs; and
    receive a bitmap from the network node in Downlink Control Information (DCI) indicating unused resources in one or more CCE groups that are allocated for a data message.

26. A method for allocating resources to a wireless device, the method comprising a network node:
  transmitting configuration information via in a Radio Resource Control (RRC) signaling message to the wireless device configuring a search space for the wireless device with at least two groups of Control Channel Elements (CCEs), the configuration information in the RRC message indicating a size of each group of CCEs;
  transmitting a control message in one of the groups of CCEs; and
  transmitting a bitmap to the wireless device in Downlink Control Information (DCI) indicating unused resources in one or more CCE groups that are allocated to the wireless device for a data message.

27. A method for receiving allocation of resources from a network node, the method comprising a wireless device:
  receiving configuration information in a Radio Resource Control (RRC) message from the network node configuring a search space for the wireless device with at least two groups of Control Channel Elements (CCEs) the configuration information in the RRC message indicating a size of each group of CCEs;
  receiving a control message from the network node in one of the groups of CCEs; and
  receiving a bitmap from the network node in Downlink Control Information (DCI) indicating the unused resources in one or more CCE groups that are allocated for a data message.

* * * * *